Figure 1:
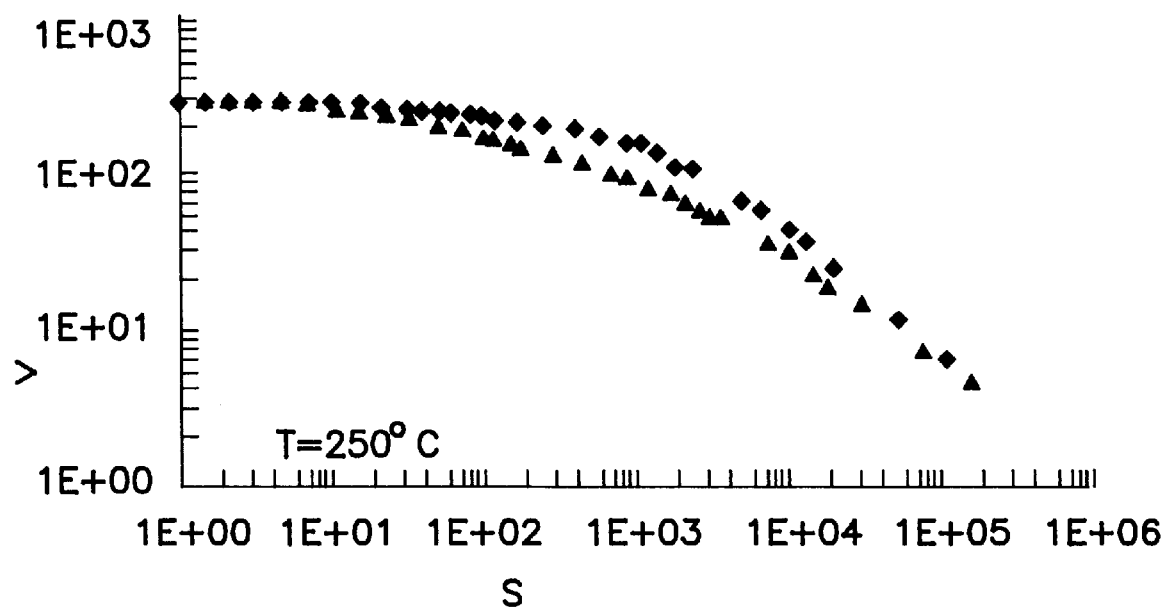

United States Patent

Glück et al.

[11] Patent Number: 5,959,069
[45] Date of Patent: Sep. 28, 1999

[54] H-SHAPED POLYAMIDES

[75] Inventors: Alexander Glück, Freinsheim; Walter Götz, Ludwigshafen; Stefan Grutke, Neustadt; Martin Laun, Ludwigshafen; Volker Warzelhan, Weisenheim, all of Germany

[73] Assignee: BASF Aktiengesellschaft, Ludwigshafen, Germany

[21] Appl. No.: 08/997,394

[22] Filed: Dec. 23, 1997

[30] Foreign Application Priority Data

Dec. 23, 1996 [DE] Germany ............... 196 54 179

[51] Int. Cl.$^6$ .............. C08G 73/10; C08G 69/02; C08G 69/08; C08G 69/12
[52] U.S. Cl. .............. 528/332; 528/310; 528/322; 528/324; 528/331; 528/335; 528/336; 528/338; 528/339; 528/340; 528/347
[58] Field of Search ............... 528/310, 322, 528/324, 332, 331, 338, 339, 340, 347, 335, 336

[56] References Cited

U.S. PATENT DOCUMENTS

| | | | |
|---|---|---|---|
| 3,687,904 | 8/1972 | Middleton | 260/78 |
| 3,893,981 | 7/1975 | Thoma et al. | 260/78 |
| 5,081,222 | 1/1992 | Reimann et al. | 528/324 |
| 5,298,595 | 3/1994 | Reimann et al. | 528/324 |

FOREIGN PATENT DOCUMENTS

| | | |
|---|---|---|
| 345 648 | 12/1989 | European Pat. Off. . |
| 2 233 768 | 1/1974 | Germany . |
| 50 2791 | 11/1973 | Japan . |

*Primary Examiner*—P. Hampton-Hightower
*Attorney, Agent, or Firm*—Keil & Weinkauf

[57] ABSTRACT

Polyamides are built up from, as fundamental building blocks (a), lactams or aminocarboxylic acids or mixtures of these, as fundamental building blocks (b), from 1 to 50 $\mu$mol of at least tribasic amines or carboxylic acids per gram of polyamide, as fundamental building blocks (c), dibasic carboxylic acids or amines and as fundamental building blocks (d), monobasic carboxylic acids or amines, where (c) and (d) are carboxylic acids if (b) are amines, and (c) and (d) are amines if (b) are carboxylic acids, the equivalents ratio of the functional groups of (b) to the functional groups of (c) and (d) together is from 60:40 to 40:60 and the equivalents ratio of the functional groups of (c) to the functional groups of (d) is from 15:85 to 60:40.

8 Claims, 1 Drawing Sheet

H-SHAPED POLYAMIDES

The invention relates to H-shaped polyamides, to processes for their preparation, to their use and to molding compositions and shaped articles made from these polyamides. H-shaped structures are developed by polymers which have more than one branching point in their polymer chain. In particular where two branching points are present at different points in the polymer molecule, H-shaped structures are developed. This distinguishes the structures from the structures of star-shaped polymers, in which all of the branches start from one point.

In the processing of injection-molded and fiber products made from polyamides, the flowability of the polyamides used when subject to shear is a determining factor, in addition to the crystallization time and the machine time, for the processing time or the cycle time of process machinery. However, an improvement in flowability, which can be achieved by reducing the molecular weight and thus the melt viscosity, often leads to inadequate mechanical properties. It is therefore desirable to improve the flowability of the polyamides used without impairing thereby the mechanical properties of the shaped articles. In addition, no further increase in viscosity should be observable during the processing of the polyamides, ie. they should be stable in the melt. A large number of polyamides satisfying the above-mentioned requirements, and processes for their preparation, are known.

JP-A-50-2791 discloses polyamides built up from ε-caprolactam, trimesic acid and hexamethylenediamine. Trimesic acid as tribasic acid and hexamethylenediamine as dibasic amine serve to develop branching structures here. No monofunctional compounds are employed in preparing the polymer.

DE-A-2 233 768 discloses a process for preparing base-modified polyamides in which, besides ε-caprolactam and ε-aminocaproic acid, diethylenetriamine, adipic acid and benzoic acid are employed to develop branching structures in the polymer. At least 45 μmol of diethylenetriamine are employed per gram of polymer. The ratio of adipic acid to benzoic acid is selected so that the equivalents ratio of dicarboxylic acid to monocarboxylic acid is at least 4:1.

EP-A-0 345 648 relates to thermoplastically processable polyamides. The polyamides are prepared from ε-caprolactam or an aminocarboxylic acid, a mixture of trimesic acid and nitrilotriethylamine being predominantly employed, beside diamines and monoamines. In an embodiment, 60 μmol of trimesic acid per gram of polymer, 30 μmol of hexamethylenediamine per gram of polymer and 120 μmol of 3-amino-1-cyclohexylaminopropane per gram of polymer are employed.

The polymers described above still have an unsatisfactory melt viscosity, so that the flowability under conditions of shear is too low for many applications. They also have to some extent unsatisfactory mechanical properties.

It is an object of the present invention to provide polyamides which have improved flowability and very good mechanical properties and which avoid the disadvantages of the known polyamides. A process for preparing these polyamides should likewise be provided.

We have found this object is achieved by means of polyamides made from, as fundamental building blocks (a), lactams or aminocarboxylic acids or mixtures of these, as fundamental building blocks (b), from 1 to 50 μmol of at least tribasic amines or carboxylic acids per gram of polyamide, as fundamental building blocks (c), dibasic carboxylic acids or amines and as fundamental building blocks (d), monobasic carboxylic acids or amines, where (c) and (d) are carboxylic acids if (b) are amines, and (c) and (d) are amines if (b) are carboxylic acids, the equivalents ratio of the functional groups of (b) to the functional groups of (c) and (d) together is from 60:40 to 40:60 and the equivalents ratio of the functional groups of (c) to the functional groups of (d) is from 15:85 to 60:40.

According to the invention it was found that polyamides with H-shaped structures have the desired property profile. They have very good flowability under conditions of shear and have a high mechanical strength. They are stable in the melt, ie. the viscosity of the melt of the polyamides does not increase during processing.

Polyamides with H-shaped structures, ie. with more than 1 branching point in the molecule, are obtained from the monomers listed above. The novel polyamides can be obtained by reacting the fundamental building blocks (a), (b), (c) and (d) at from 250 to 300° C. and at a pressure of from 1 to 40 bar in the presence of steam.

Preferred embodiments of the invention are described below.

The novel polyamides are built up from fundamental building blocks (a) which are mixed with at least tribasic, as well as di- and monobasic, amines or carboxylic acids. Suitable fundamental building blocks (a) are lactams or aminocarboxylic acids or mixtures of these, for example lactams and amino acids having from 4 to 20 carbon atoms, preferably from 4 to 12 carbon atoms, lactams with 5 carbon atoms being excluded. Examples are ε-caprolactam, heptanelactam, laurinlactam and dodecalactam, and the corresponding amino acids, and aminoundecanoic acid and p-aminomethylbenzoic acid.

As fundamental building blocks (b), at least tribasic amines or carboxylic acids are used. Examples of suitable at least tribasic amines or carboxylic acids are described in EP-A-0 345 648. The at least tribasic amines have at least three amino groups capable of reacting with carboxylic acid groups. They preferably have no carboxylic acid groups. The at least tribasic carboxylic acids have at least three carboxylic acid groups which are capable of reacting with amines and which may, for example, also be in the form of their derivatives, such as esters. The carboxylic acids preferably have no amino groups capable of reacting with carboxylic acid groups. The fundamental building blocks (b) are preferably soluble in a melt of the fundamental building blocks (a). They may also be dissolved by salt formation with the fundamental building blocks (c) and/or (d). Examples of suitable carboxylic acids (b) are trimesic acid, trimerized fatty acids which may, for example, be prepared from oleic acid and may have from 50 to 60 carbon atoms and naphthalenepolycarboxylic acids, such as naphthalene-1,3,5,7-tetracarboxylic acid. The carboxylic acids (b) are preferably defined organic compounds rather than polymeric compounds.

Examples of amines with at least 3 amino groups are nitrilotrialkylamines, in particular nitrilotriethylamine, dialkylenetriamines, in particular diethylenetriamine, trialkylenetetramines and tetraalkylenepentamines, alkylene being preferably ethylene. Dendrimers may also be used as amines and preferably have the formula I

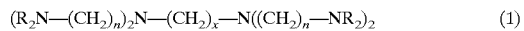

(1)

where
R is H or —(CH$_2$)$_n$—NR$^1$$_2$ where $R^1$ is H or —$(CH_2)_n$—$NR^2_2$ where
$R^2$ is H or —$(CH_2)_n$—$NR^3_2$ where
$R^3$ is H or —$(CH_2)_n$—$NH_2$,
n is an integer from 2 to 6 and
x is an integer from 2 to 14.

n is preferably the integer 3 or 4, in particular 3, and x is preferably an integer from 2 to 6, preferably from 2 to 4, in particular 2. Each of the radicals R can also, independently of the other, be as defined. The radical R is preferably hydrogen or —$(CH_2)_n$—$NH_2$.

Suitable carboxylic acids are those having from 3 to 10 carboxylic acid groups, preferably 3 or 4 carboxylic acid groups. Preferred carboxylic acids are those having aromatic and/or heterocyclic rings. Examples of these are benzyl, naphthyl, antracene, biphenyl and triphenyl, or heterocycles such as pyridine, bipyridine, pyrrole, indole, furan, thiophene, purine, quinoline, phenanthrene, porphyrine, phthalocyanine and naphthalocyanine. Preference is given to 3,5,3',5'-biphenyltetracarboxylic acid phthalocyanine, naphthalocyanine, 3,5,3',5'-biphenyltetracarboxylic acid, 1,3,5,7-naphthalenetetracarboxylic acid, 2,4,6-pyridinetricarboxylic acid, 3,5,3',5'-bipyridyltetracarboxylic acid, 3,5,3',5'-benzophenonetetracarboxylic acid, 1,3,6,8-acridinetetracarboxylic acid, particularly preferably 1,3,5-benzenetricarboxylic acid (trimesic acid) and 1,2,4,5-benzenetetracarboxylic acid. Such compounds are available industrially or can be prepared by the process described in DE-A4 312 182. If ortho-substituted aromatic compounds are used, imide formation is preferably impeded by selecting suitable reaction temperatures.

The fundamental building blocks (b) are at least trifunctional, preferably at least tetrafunctional. The number of functional groups here can be from 3 to 16, preferably from 4 to 10, particularly preferably from 4 to 8. In the novel polyamides, either at least tribasic amines or at least tribasic carboxylic acids, but not mixtures of corresponding amines and carboxylic acids, are employed. Small amounts of at least tribasic amines may, however, be contained in the tribasic carboxylic acids, and vice versa.

The fundamental building blocks (b) are present in an amount, per gram of polyamide, of from 1 to 50 μmol, preferably from 1 to 35 μmol, and particularly preferably from 1 to 20 μmol, the polyamide here being the polyamide comprising the components (a) to (d). The fundamental building blocks (b) are preferably present in an amount of equivalents per gram of polyamide of from 3 to 150 μmol, preferably from 5 to 100 μmol, and in particular from 10 to 70 μmol, the equivalents here being based on the number of functional amino groups or carboxylic acid groups.

The bifunctional fundamental building blocks (c) are dibasic carboxylic acids or dibasic amines. They therefore have 2 carboxylic acid groups which can be reacted with amino groups or 2 amino groups which can be reacted with carboxylic acids. The dibasic carboxylic acids or amines contain no functional groups, other than the carboxylic acid groups or amino groups, which can react with amino groups or carboxylic acid groups. They preferably contain no other functional groups. Examples of suitable dibasic amines are those which form salts with dibasic carboxylic acids. They can be linear and aliphatic, for example $C_{1-14}$-alkylenediamines, preferably $C_{2-6}$-alkylenediamines, such as hexylenediamine. They may also be cycloaliphatic, for example isophoronediamine, Dicycyan and Laromin. Branched aliphatic diamines may also be used, an example being Vestamin TMD (trimethyl-hexamethylenediamine, produced by Hüls AG). The diamines may also be aromatic-aliphatic, for example m-xylylenediamine can be used. Each of the abovementioned amines may be substituted on the carbon framework with $C_{1-12}$-alkyl, preferably $C_{1-4}$-alkyl.

Examples of dibasic carboxylic acids are those which form salts with dibasic diamines. They may be linear aliphatic dicarboxylic acids, preferably $C_{4-20}$-dicarboxylic acids, for example adipic acid, azelaic acid, sebacic acid or octanedioic acid. They may also be aromatic, for example isophthalic acid, terephthalic acid, naphthalenedicarboxylic acid or dimerized fatty acids.

Monofunctional fundamental building blocks (d) are monobasic carboxylic acids or amines, for example the relevant water-soluble amines or carboxylic acids, which may be aliphatic, cycloaliphatic or aromatic. Examples of these are lower aliphatic carboxylic acids or amines, fatty acids or fatty amines and aromatic amines, in particular $C_{2-24}$-alkylcarboxylic acids, such as propionic acid, lauric acid, 2-ethylhexanoic acid, nonanoic acid and benzoic acid. Examples of suitable amines are cyclohexylamine and $C_{2-24}$-alkylamines, such as tridecylamine. An example of an aromatic amine which can be used is benzylamine.

The bifunctional fundamental building blocks (c) are preferably employed in amounts, per gram of polymer, of from 1 to 55 μm, particularly preferably from 1 to 30 μm, and in particular from 1 to 15 μm. The monofunctional building blocks can be employed in an amount, per gram of polymer, of from 5 to 100 μm, preferably from 5 to 60 μm.

If the fundamental building blocks (b) are carboxylic acids, then the fundamental building blocks (c) and (d) are amines. If the fundamental building blocks (b) are amines, then the fundamental building blocks (c) and (d) are carboxylic acids. Fundamental building blocks (b) and fundamental building blocks (c) and (d) thus always have opposed functionalities. The equivalents ratio of the functional groups of fundamental building blocks (b) to the total of the functional groups of fundamental building blocks (c) and (d) is from 60:40 to 40:60, preferably from 55:45 to 45:55. The equivalents ratio is preferably approximately balanced, ie. there are approximately as many functional groups in fundamental building blocks (b) as in fundamental building blocks (c) and (d). Thus the total of the functional end groups of the mono- and bifunctional fundamental building blocks corresponds approximately to the total of the functional groups of the at least trifunctional building blocks.

The equivalents ratio of the functional groups of (c) to the functional groups (d) is from 15:85 to 60:40, preferably from 20:80 to 50:50, in particular from 20:80 to 30:70, an equivalents ratio of from approximately 20:80 to 25:75 being specifically preferred. The equivalents ratio here is the ratio of the numbers of the respective functional groups, one to another. By means of the specific choice of the fundamental building blocks (b), (c) and (d) and their amounts and mixing ratios, a defined degree of branching in the polyamide molecules is achieved. There is preferably more than one junction per polymer chain, so that the molecules have H structure.

Particular preference is given to the following polyamides having at least tetrafunctional fundamental building blocks (b), these being of the formula (I)

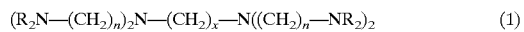

$$(R_2N—(CH_2)_n)_2N—(CH_2)_x—N((CH_2)_n—NR_2)_2 \qquad (1)$$

where

R is H or —$(CH_2)_n$—$NR^1_2$ where
$R^1$ is H or —$(CH_2)_n$—$NR^2_2$ where
$R^2$ is H or —$(CH_2)_n$—$NR^3_2$ where $R^3$ is H or $-(CH_2)_n-NH_2$, n is an integer from 2 to 6 and x is an integer from 2 to 14.

Preference is given to molecules in which x=2, n=3, R=H or $-(CH_2)_3-NH_2$. The fundamental building block (c) here is an aliphatic dicarboxylic acid, preferably adipic acid, and the fundamental building block (d) is an aliphatic monocarboxylic acid, in particular propionic acid. The remainder of the polyamide here is preferably built up from ε-caprolactam as fundamental building block (a). The fundamental building blocks (b) to (d) can be regarded as structure regulators, since they influence the development of the structure in the polyamides. It is preferable if no other structure regulators are present, in particular no structure regulators which control the degree of branching of the polyamides.

The novel polyamides have a zero-shear viscosity comparable with that of linear polyamides, together with very good flowability. The melt viscosity, in the range from $10^3$ to $10^5$ s$^{-1}$, is low, so that the polyamides are easy to process, especially by extruding or injection molding. The novel polyamides have very good mechanical properties which allow them to be employed for a wide variety of applications.

The novel polyamides have very high melt stability. Polyamides are described as stable in the melt if, after drying, their zero-shear viscosity, which can be determined theologically using oscillating shear, increases by a maximum of 10% after 10 minutes at 280° C. in an inert gas atmosphere. For this, the polyamides are firstly dried for 4 days at 80° C. in order to exclude any influence of water on the result obtained. Polyamides which are stable in the melt can be employed, in particular, in shaping processes which use heat, since they show little or no change in viscosity under thermal stress.

The manner of preparation of the novel polyamides can be chosen without restriction. All of the fundamental building blocks (a) to (d) can be reacted together to give the novel polyamide, prepolymers of the fundamental building blocks (a) to (d) can be prepared and then reacted further as far as the desired molecular weight or viscosity, fundamental building blocks (a) can be reacted to give a prepolymer which is then reacted with the fundamental building blocks (b) to (d), or the fundamental building blocks (b) to (d) can be incorporated into a finished polymer of the fundamental building blocks (a). This can take place, for example, using an extruder.

The invention also relates to a process for preparing the above-mentioned polyamides by reacting the fundamental building blocks (a), (b), (c) and (d) at from 250 to 300° C., preferably from 260 to 280° C., in particular from 250 to 270° C., and at a pressure of from 1 to 40 bar, preferably from 1 to 30 bar, in particular from 1 to 20 bar, in the presence of steam, the pressure here being predominantly the steam pressure. The reaction is a polycondensation when aminocarboxylic acids are used as fundamental building blocks (a) and a polyaddition when lactams are used as fundamental building blocks (a). The fundamental building blocks (b) to (d) are incorporated into the polymer framework by polycondensation. The reaction can also be described as hydrolytic polymerization.

The fundamental building blocks are preferably thoroughly mixed together before the reaction.

The fundamental building blocks (a) can be reacted directly with the other fundamental building blocks (b) to (d), but prepolymerized fundamental building blocks (a) in the form of a prepolymer may also be employed. For this, the fundamental building blocks (a) are converted completely or partially to a prepolymer, and the prepolymer is reacted with the fundamental building blocks (b), (c) and (d). The reaction is an equilibrium reaction, so that even if fundamental building blocks (a) have been reacted completely to give a prepolymer, a novel polyamide with H structure is obtained by adding the fundamental building blocks (b) to (d).

The reaction can be carried out discontinuously or continuously. The discontinuous reaction is preferably carried out in an autoclave. For the preferred continuous reaction, the fundamental building blocks (a) to (d) are preferably premixed and continuously polymerized in a precondensation pipe to a low viscosity. Precondensation pipes are described in Vieweg, Müller; Polyamide, Hauser-Verlag 1966, p. 190 ff. The resultant low-viscosity products are then continuously annealed until the desired molecular weight or viscosity is attained. The viscosity of the novel polyamides is preferably from 80 to 350 ml/g and particularly preferably from 120 to 280 ml/g, the viscosity number being determined according to ISO 1628 on a 0.5% strength by weight solution in concentrated sulfuric acid at 23° C.

The resultant end-products are continuously extracted with water. In the preparation of polyamide prepolymers, they are preferably polymerized to a viscosity number of from 40 to 80 ml/g. The preparation can be carried out, for example, by the processes described in EP-A-0 129 195 and EP-A-0 129 196. In these processes, an aqueous solution of the monomers is heated to from 250 to 300° C. under elevated pressure, with simultaneous evaporation of water and formation of a prepolymer, prepolymer and steam are then continuously separated, and the steam is recycled. Finally, the prepolymer is passed into a polycondensation zone and polycondensed at a pressure of from 1 to 10 bar above atmospheric pressure and at from 250 to 300° C. The solution of the monomers here is heated at a pressure of from 1 to 10 bar above atmospheric pressure over a residence time of less than 60 seconds, giving, at discharge from the evaporation zone, a degree of conversion of preferably at least 93% by weight and a water content of the prepolymer of at most 7% by weight. The aqueous solutions used here generally have a monomer content of from 30 to 70% by weight, in particular from 40 to 65% by weight.

The aqueous solution of monomers at from 50 to 100° C. is preferably passed continuously into an evaporation zone where it is heated to from 250 to 300° C. at a pressure which is from 1 to 10 bar, preferably from 2 to 6 bar, above atmospheric pressure. The residence time is preferably from 10 to 55 seconds, in particular from 10 to 40 seconds. The conversion is preferably from 95 to 98%, and the water content is preferably from 2 to 5% by weight, in particular from 1 to 3% by weight. The evaporation zone is preferably constructed as tube bundle. Particular preference is given to tube bundles in which the cross section of the individual tubes changes repeatedly between tube-shaped and slot-shaped. It can be advantageous, immediately following the evaporation zone, to pass the mixture of prepolymer and steam through a tubular mass transfer zone provided with internals, before separating the phases. In this, the temperatures and pressure conditions used in the evaporation zone are maintained. The internals, such as packings, for example Raschig rings, metal rings or especially wire gauze packings, create a large surface area, bringing the phases, ie. prepolymers and steam, into intimate contact. The residence time in the mass transfer zone is generally from 1 to 15 minutes.

The two-phase mixture of steam and prepolymers which comes out of the evaporation zone, or the mass transfer zone if used, is separated, this generally taking place spontaneously. The resultant prepolymers are passed into a polymerization zone, where the reaction takes place at from 250 to 300° C., particularly preferably from 260 to 280° C., at a pressure which is from 1 to 10 bar, preferably from 2 to 6 bar, above atmospheric pressure. The residence time is preferably from 5 to 30 minutes. The resultant polyamide prepolymer preferably has a viscosity number of from 40 to 80 ml/g, particularly preferably from 50 to 75 ml/g.

The resultant prepolymers can be passed in the molten state through a metering zone, with simultaneous removal of the residual water contained in the melt. Suitable metering zones are vented extruders. The water-free melt can be extruded and granulated, and mixed and melted with the fundamental building blocks (b) to (d) in an extruder, preferably a twin-screw extruder, the novel polyamide being extruded, cooled and granulated. The fundamental building blocks (b) to (d) can also be added into the vented extruder. For this, the vented extruder may be equipped with suitable mixing elements, such as kneaders. The resultant granules can be reacted or condensed in the solid phase under inert gas, continuously or discontinuously at a temperature below the melting point, for example from 170 to 240° C., until the desired viscosity is obtained. Tumble dryers or, for the continuous reaction, annealing tubes through which hot inert gas is passed, may be used. The continuous solid phase reaction is preferred, nitrogen or, in particular, superheated steam being used as inert gas.

The novel polyamides can be used for producing molding compositions or shaped articles. The invention thus relates also to molding compositions which comprise the novel polyamides described above.

These novel molding compositions can contain other additives and processing aids which are usual for polyamides, such as stabilizers, oxidation inhibitors, heat stabilizers, UV stabilizers, mold release agents, colorants, such as dyes and pigments, fibrous and pulverulent fillers and reinforcing agents, nucleating agents, plasticizers, etc. They are generally present in the molding compositions in proportions of not more than 80% by weight, preferably not more than 50% by weight.

Examples of oxidation inhibitors and heat stabilizers are salts of sub-group metals, such as copper (I) halides, in particular chlorides, bromides or iodides, if desired in combination with salts of metals of group I of the periodic table, such as sodium halides, potassium halides and/or lithium halides. Use may also be made of sterically hindered phenols, hydroquinones, aromatic secondary amines, such as diphenylamines, various substituted members of these groups, and mixtures of these, in concentrations of up to 1% by weight, based on the total weight of the molding composition.

Examples of UV stabilizers are substituted resorcinols, salicylates, benzotriazoles and benzophenones. An example of an organic dye is nigrosin. Examples of pigments are titanium dioxide, cadmium sulfide, cadmium selenide, phthalocyanines, ultramarine blue and carbon black. Examples of fillers and reinforcing agents are carbon fibers, glass fibers, amorphous silica, asbestos, calcium silicate, wollastonite, aluminum silicate, magnesium carbonate, kaolin, chalk, powdered quartz, mica and feldspar. The proportion of fillers and colorants is in general up to 50% by weight, preferably from 20 to 35% by weight, based on the total weight of the molding composition.

Examples of nucleating agents which may be employed are talc, calcium fluoride, sodium phenyl phosphinate, alumina and finely divided polytetrafluoroethylene.

Examples of plasticizers are dioctyl phthalate, dibenzyl phthalate, butyl benzyl phthalate, hydrocarbon oils, N-(n-butyl)benzenesulfonamide and o- and p-tolueneethylsulfonamide.

Any conventional flame retardant, for example halogen compounds, metal hydroxides, phosphorus compounds, or red phosphorus itself, may moreover also be added.

From the novel molding compositions or novel polyamides, it is possible to produce any desired shaped article by known processes, for example injection molding, extrusion or extrusion blow-molding. The invention thus also relates to shaped articles made from the molding compositions and polyamides described. The polyamides described may also be used for producing fibers.

The invention is described below by means of examples.

Preparation of the Polyamides

The novel polyamides were prepared in an agitated autoclave by metering the fundamental building blocks listed in Table 1 into an $\epsilon$-caprolactam preparation which had been polymerized by the discontinuous process described above.

TABLE 1

Formulations of the polyamides

| | Monomer (a) | Fundamental building block (b) | Fundamental building block (c) | Fundamental building block (d) | Equivalents ratio (c):(d) |
|---|---|---|---|---|---|
| Comparative example 0 | CL 100%*** | | | | |
| Comparative example 1 | CL 99.1% | N6-dendrimer 17.4 μmol | Adipic acid 27.7 μmol | Propionic acid 14.0 μmol | 80:20 |
| Comparative example 2 (Ex. 14 from EP 0345 648) | CL 96.7% | Trimesic acid 70 μmol | HMD 30 μmol | L-252*) 150 μmol | 28:72 |
| Comparative example 3 (Ex. 18 from EP 0345 648) | CL 97.7% | Trimesic acid N-TEA**) 20 μmol | Adipic acid 32 μmol | L-252*) 124 μmol | 34:66 |
| Comparative example 4 | CL 99.1% | N6-dendrimer 17.4 μmol | — | Propionic acid 69.2 μmol | — |
| Example 1 | CL 99.1% | N6-dendrimer 17.4 μmol | Adipic acid 6.9 μmol | Propionic acid 55.4 μmol | 20:80 |
| Example 2 | CL 99.82% | N6-dendrimer 3.5 μmol | Adipic acid 1.37 μmol | Propionic acid 10.8 μmol | 20:80 |
| Example 3 | CL 99.3% | N14-dendrimer 6.7 μmol | Adipic acid 13.7 μmol | Propionic acid 27.0 μmol | 50:50 |
| Example 4 | CL 99.84% | N6-dendrimer 1.3 μmol | Adipic acid μmmol | Propionic acid 8.1 μmol | 25:75 |

*)3-Amino-1-cyclohexylaminopropane
**)Nitrilotriethylamine
***)Ultramid B3 from BASF AG CL: $\epsilon$-caprolactam N6-dendrimer: ($H_2$ N—$(CH_2)_3$ $_2$N—$(CH_2)_2$—N$(CH_2)_3$—$NH_2$)

N14-dendrimer: (($H_2$N—$(CH_2)_3)_2$)N—$(CH_2)_3)_2$N—$(CH_2)_2$—N(($CH_2)_2$—N(($CH_2)_3$—$NH_2)_2)_2$ To determine the flowability, the zero-shear viscosity and melt viscosity of the polyamides were investigated, the zero-shear viscosity being determined according to ISO 1628 and the melt viscosity by means of oscillating shear at 250° C.

The results are given in Table 2 below.

TABLE 2

Viscosities of the polyamides

| | Viscosity number | Zero-shear viscosity in Pas | Zero-shear viscosity in Pas after 10 mins at 280° C. under $N_2$ | Melt viscosity at $10^3$ $s^{-1}$ in Pas | Melt viscosity at $10^4$ $s^{-1}$ in Pas | Melt viscosity at $10^5$ $s^{-1}$ in Pas |
|---|---|---|---|---|---|---|
| Comparative example 0 | 140 | 279 | 303 | 180 | 50 | 9.5 |
| Comparative example 1 | 201 | 1866 | 2517 | 350 | 70 | 15 |
| Comparative example 2 (Ex. 14 from EP 0345 648) | 250 | 2415 | 4250 | 542 | 167 | 34 |
| Comparative example 3 (Ex. 18 from EP 0345 648) | 243 | 2237 | 4500 | 483 | 143 | 30 |
| Comparative example 4 | 158 | 290 | 316 | 184 | 49 | 9.3 |
| Example 1 | 134 | 260 | 281 | 105 | 35 | 7.5 |
| Example 2 | 156 | 236 | 259 | 125 | 40 | 7 |
| Example 3 | 134 | 234 | 255 | 110 | 30 | 7 |
| Example 4 | 127 | 696 | 730 | 270 | 62 | 11 |

The melt stability was determined by measuring zero-shear viscosity after storing the specimen in the rheometer at 280° C. for 10 minutes. To determine the melt viscosity, flow curves were determined at 250° C. on a Göttfert HKV (high pressure) capillary rheometer or an AVM nitrogen capillary viscometer.

The nozzle geometries used were:

HKV: L/R=60; R=0.50 mm, range from 576 to 11500 $s^{-1}$ L/R=60; R=0.25 mm, range from 1843 to 92160 $s^{-1}$ AVM: L/R=50; R =0.60 mm, range from 40 to 1500 $s^{-1}$ It is apparent from the results of Table 2 that the novel polyamides have a very low melt viscosity under shear compared with linear polyamides. They therefore have good flowability. The zero-shear viscosities after storage of specimens at 280° C. for 10 minutes are also very low, ie. the melts are very stable.

In the Drawings

FIG. 1 shows flow curves of polyamides. The viscosity (in Pas) is shown in dependence on the shearing rates (in 1/s).

The flow curves for the polyamides from Comparative example 1 (above) and Example 1 (below) are shown in the attached FIG. 1, from which it is seen that the polyamides of Example 1 have a clearly lower viscosity in the shear-rate range from $10^1$ to $10^5$ $s^{-1}$, compared with the comparative polyamides.

The mechanical properties of the polyamides are listed in Table 3 below. The Charpy notched impact strength according to ISO 179/1eA (measurement after drying) and the tensile modulus of elasticity, the yield stress and the elongation at break according to ISO 527 (measurement after drying) were determined.

TABLE 3

Mechanical testing of the polyamides

| | Charpy notched impact strength | Tensile modulus of elasticity in MPa | Yield sress in MPa | Elongation at break in % |
|---|---|---|---|---|
| Comparative example 0 | 8 | 2920 | 87 | 4.5 |
| Comparative example 1 | 12 | 2680 | 76 | 4.8 |
| Comparative example 2 (Ex. 14 from EP 0345 648) | 15 | 1950 | 62 | 6.2 |
| Comparative example 3 (Ex. 18 from EP 0345 648) | 18 | 1720 | 58 | 6.3 |
| Comparative example 4 | 7 | 2806 | 80 | 4.7 |
| Example 1 | 9 | 3010 | 89 | 4.5 |
| Example 2 | 7 | 2890 | 86 | 4.5 |
| Example 3 | 8 | 2950 | 87 | 4.5 |
| Example 4 | 8 | 2900 | 87 | 4.5 |

The results of Table 3 show that the novel polyamides have mechanical properties which are as good as those of the comparative polyamides.

We claim:

1. A polyamide composition comprising:
    (a) a lactam or an aminocarboxylic acid, or a mixture of both;
    (b) from 1 to 50 μmol of at least a tetrafunctional amine or at least a tribasic carboxylic acid per gram of polyamide;
    (c) a dibasic carboxylic acid or a dibasic amine; and
    (d) a monobasic carboxylic acid or a monobasic amine, with the proviso that (c) and (d) are each a carboxylic acid if (b) is an amine and (c) and (d) are each an amine if (b) is a carboxylic acid;
    wherein the equivalents ratio of the functional groups of (b) to the functional groups of (c) and (d) together is from 60:40 to 40:60; and wherein the equivalents ratio of the functional groups of (c) to the functional groups of (d) is from 15:85 to 60:40.

2. A polyamide as defined in claim 1, where (b) has the formula I $$(R_2N-(CH_2)_n)_2N-(CH_2)_x-N((CH_2)_n-NR_2)_2 \quad (I)$$

where

R is H or $-(CH_2)_n-NR^1{}_2$ where
$R^1$ is H or $-(CH_2)_n-NR^2{}_2$ where
$R^2$ is H or $-(CH_2)_n-NR^3{}_2$ where
$R^3$ is H or $-(CH_2)_n-NH_2$,
n is an integer from 3 to 6 and
x is an integer from 2 to 14.

3. A process for preparing a polyamide as defined in claim 1 by reacting (a), (b), (c) and (d) at from 250 to 300° C. and at a pressure of from 1 to 40 bar in the presence of steam.

4. A process as defined in claim 3, wherein (a) is converted completely or partially to a prepolymer, and the prepolymer is then reacted with (b), (c) and (d).

5. A process as defined in claim 3, where the reaction is a continuous reaction.

6. A molding composition comprising the polyamide as defined in claim 1.

7. A shaped article or a fiber made from a molding composition as defined in claim 6.

8. A process for the production of shaped articles, by injection molding, extrusion blow-forming or extrusion or of fibers by fiber-spinning of a molding composition as defined in claim 6.

* * * * *